C. G. OLSON.
METHOD OF PRODUCING HOBS.
APPLICATION FILED JAN. 5, 1920.

1,357,815.

Patented Nov. 2, 1920.
2 SHEETS—SHEET 1.

Inventor:
Carl G. Olson
By Cheever & Cox
Attys

C. G. OLSON.
METHOD OF PRODUCING HOBS.
APPLICATION FILED JAN. 5, 1920.
1,357,815.
Patented Nov. 2, 1920.
2 SHEETS—SHEET 2.
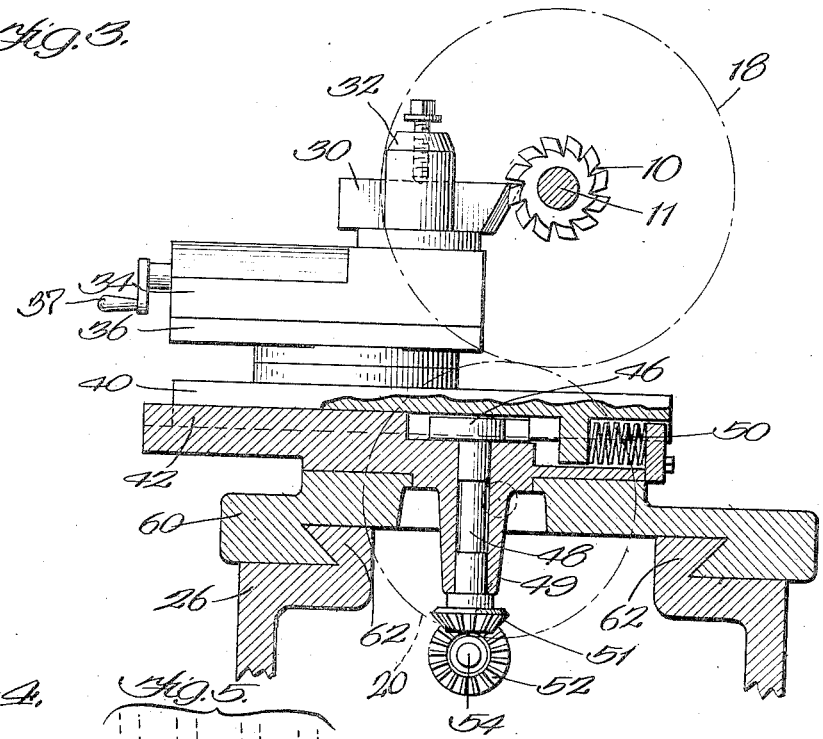
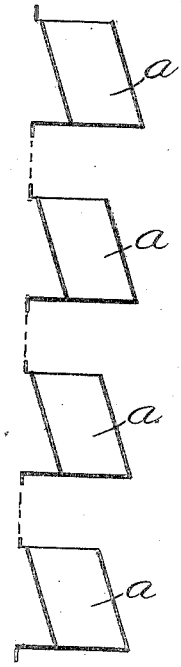
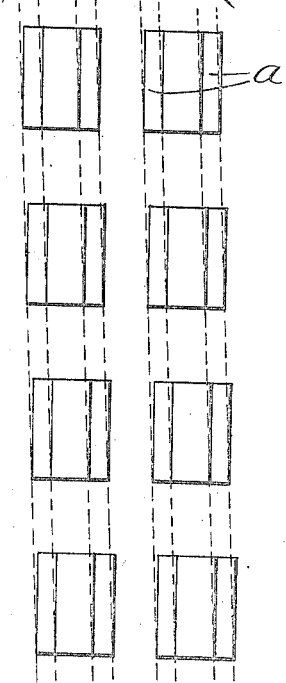
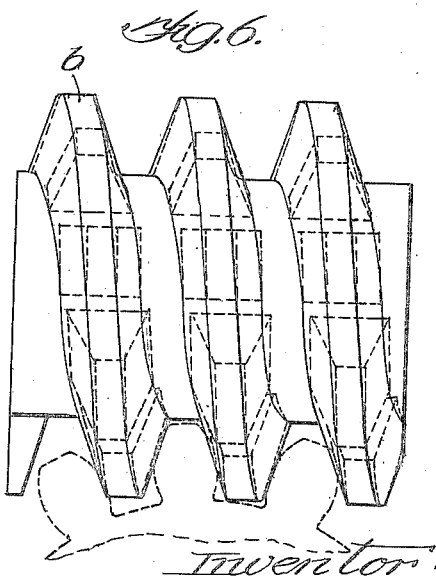
Inventor
Carl G. Olson
By Cheever & Cox Attys

UNITED STATES PATENT OFFICE.

CARL G. OLSON, OF CHICAGO, ILLINOIS, ASSIGNOR TO ILLINOIS TOOL WORKS OF CHICAGO, ILLINOIS, A CORPORATION OF ILLINOIS.

METHOD OF PRODUCING HOBS.

1,357,815.　　　　Specification of Letters Patent.　　Patented Nov. 2, 1920.

Application filed January 5, 1920. Serial No. 349,487.

*To all whom it may concern:*

Be it known that I, CARL G. OLSON, a citizen of the United States, residing at Chicago, in the county of Cook and State of Illinois, have invented a certain new and useful Improvement in Methods of Producing Hobs, of which the following is a specification.

In cutting gears or splines with ordinary hobs, the hob must be set at an angle to the work corresponding to the helix angle of the hob. This angular setting of the hob requires that the machine in which the hob is used be especially adapted for the purpose, and this makes the machine more complex than it would have to be if the hob could be set at right angles to the axis of the gear being cut. Also the act of adjusting the machine for using the ordinary hob requires time, skill, and care. One object of my invention is to produce a hob which can be placed with its axis at right angles to the axis of the gear being cut. This is not broadly new, as evidenced by the Zimmermann Patent 1,151,324. But in the hob shown by Zimmermann, the teeth conform to the helix or spiral of the hob and the result is that the utility of the hob is limited to a narrow range of angles, that is, the hob must have a relatively slow pitch. One of the objects of my invention is to provide a hob which is usable through a much greater range of pitch angles. To accomplish my objects, I modify the shape of the individual teeth. The cutting edges of the successive teeth are located in the helicoid, but the portion behind the cutting face is straightened or rectified so that the back portion of the teeth will not interfere with the teeth of the gear being cut. In my hob, the teeth are straightened away from the helix and against the lead of the thread. The degree to which the individual teeth are straightened will be affected by the helix angle, the diameter of the hob and the pressure angle. The modification will occur between two extremes one of which is the true helix of the hob, and the other is a ring encircling the hob at right angles to its axis.

In addition to its other advantages, my hob finishes the work more uniformly, because the angles at the two sides of the cutting face are more nearly equal than in the case of ordinary hobs where the angle is obtuse at one side of the face and acute at the other. That portion of the cutting face of the tooth where the angle is obtuse (in an ordinary hob) does not cut as well as that portion where the angle is acute. In a hob produced according to my invention, the angles are more nearly alike at both sides, and hence the cutting effect is substantially uniform at both sides and a better finish is produced.

It will facilitate an understanding of my hob to explain both the construction of the hob and the construction and mode of operation of a machine adapted to produce it. Consequently, attention is directed to the accompanying drawings in which, Figure 1 is a plan view of the head stock, tail stock, and tool rest of a back-off or relieving machine by which my hob may be produced.

Fig. 3 is a sectional elevation on the line 3—3, Fig. 1.

Figure 1:
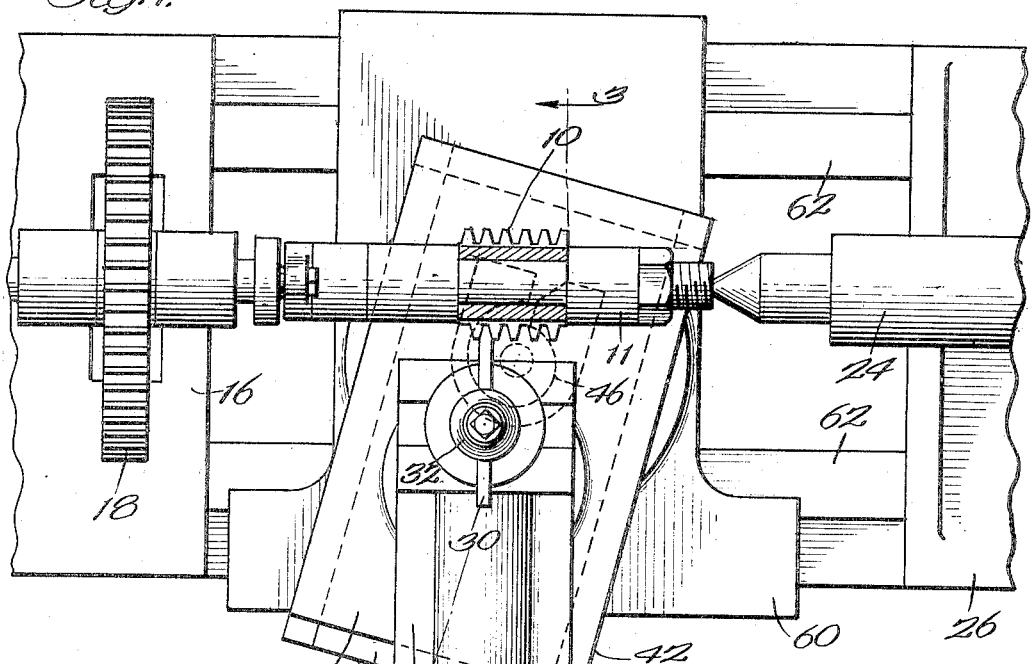

Fig. 4 shows a row of hob teeth viewed axially, or from the side of the teeth and showing the radial relief. The individual teeth appear as they would when looking at the end of the hob, but with the teeth in a straight row instead of a circle, the view in this sense being a development. The appearance of these teeth when viewed as in this figure is the same as in the case of an ordinary hob.

Fig. 5 is a development looking toward the left in Fig. 4, and shows in dotted lines the angle which the teeth of an ordinary hob would have and showing in full lines the rectified teeth which constitute the improvement of my hob.

Fig. 6 is a side view of a worm or helicoid showing, in dotted lines, the conformation of the teeth of my hob. It will be observed that the front faces or cutting edges of the teeth coincide with the worm while the portion behind is rectified to a greater or less extent; in other words, brought more nearly parallel to a plane perpendicular to the axis of the hob.

The worm itself is not exactly like the worm or helicoid forming the basis for an ordinary hob, but is modified in accordance with the principles of the Zimmermann patent.

In the drawings, like numerals denote like parts throughout the several views.

Referring first to the more or less diagrammatic views, Figs. 4 and 5: The top view of the teeth a is shown in full lines while the dotted lines show what the appearance would be if the teeth were helicoidal. Referring to Fig. 6, the full lines show a worm or helicoid modified according to the Zimmermann principle, while the dotted lines indicate the rectification from said helicoid. As above stated, the cutting edges of the teeth coincide with the helicoid, while the back portion of the teeth, although helicoidal, does not conform to the helicoid shown in full lines. Instead, they are straightened in a direction against the lead of the thread.

To now consider the method of generating the teeth, and a machine adapted for carrying out the method, the hob or work 10 is fastened to a work arbor 11, the latter being driven in any known manner as by a dog 12 engaged by a face plate 14, secured to a head stock spindle 15. This head stock spindle is journaled in the head stock 16 and driven by a gear wheel 18, receiving its power from any suitable source, such as the driving gear 20. The opposite end of the work arbor is supported upon a tailstock center 22 mounted in the tailstock 24. The head and tailstocks are carried upon the main framework 26 of the machine. The hob 10 illustrated in connection with the machine, Figs. 1, 2, and 3, has a greater number of teeth and a slower pitch than in the form shown in Fig. 6, the latter figure, for illustrative purposes, showing a form in which the difference between the true helicoid and the rectified teeth is somewhat more exaggerated.

A formed tool 30 for producing the hob is mounted in a tool post 32 mounted upon a tool post slide 34. Said slide is mounted upon a guide 36, and its position thereon is controlled by a crank 37 operating a screw 38 in the well known manner. Guide 36 is pivotally mounted upon a carriage 40 in such manner as to be rotatable about a vertical axis. In common parlance, the tool post guide is "swiveled" to the carriage, and the latter is of the "backing off" type, being mounted upon a guide 42 and caused to reciprocate on it by a snail cam 44 shown in dotted lines in Fig. 1 and in full lines in Fig. 3. The cam is fastened to a vertical shaft 48 mounted in a bearing 49 forming part of the guide or table 42. A spring 50 holds the carriage 40 in contact with the cam and the result is that as the cam rotates, the tool is gradually moved inward toward the axis of the hob and then when the end of the rise of the cam is reached is suddenly returned by the action of the spring, thus producing the desired relief in the hob teeth. Shaft 48 is driven by any suitable gearing, as the bevel gear 51 which meshes with a bevel gear 52 fastened to a shaft 54. Said shaft extends lengthwise of the main frame and is mounted in appropriate stationary bearings 56 shown at the left end of Fig. 2. It is driven by a pinion 58 which is splined upon it and meshes with the gear wheel 20.

The guide 42, which supports the cross slide or carriage 40, is swiveled upon the main carriage 60 which travels upon the main guides 62. Said main guides are mounted upon the main frame and extend longitudinally of the machine, parallel to the axis of the work arbor. Suitable means are provided for causing the travel of carriage 60 so as to cause the tool to travel and follow the lead of the helix of the hob, but as such feed mechanism is well known, it is not here illustrated or described. The axis upon which the guide 42 is rotatable relatively to the main carriage is coincident with the axis of cam shaft 48.

Figure 2:
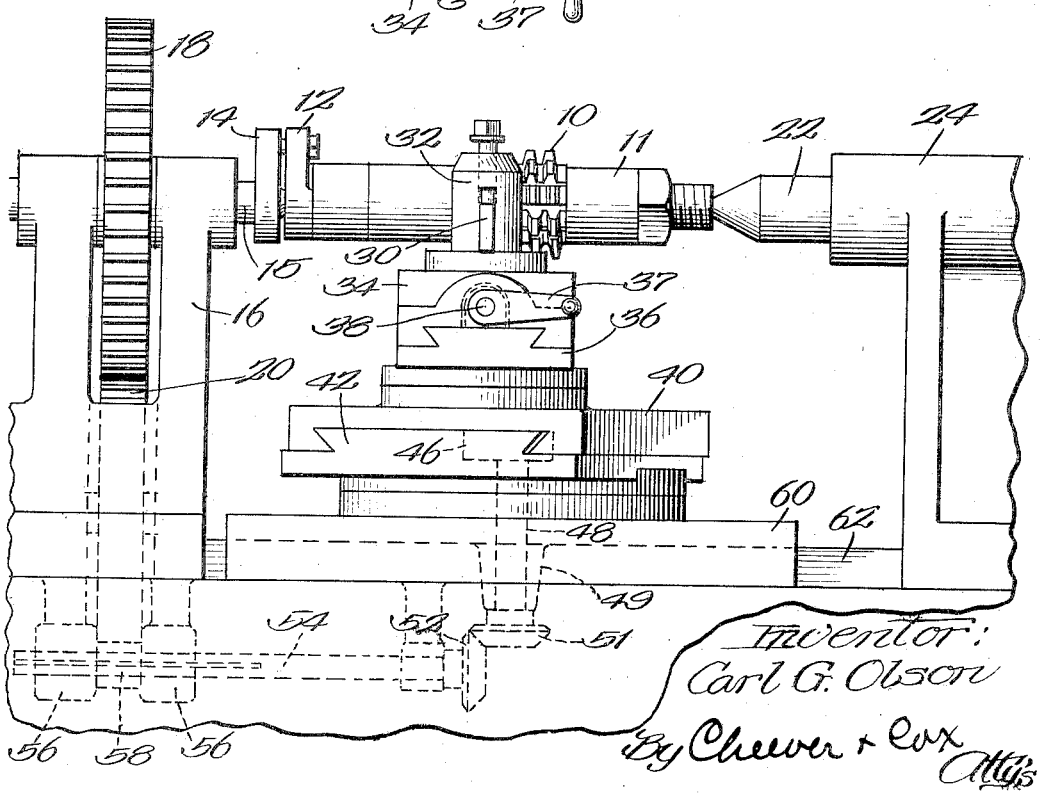
Fig. 2 is a front elevation of the parts shown in Fig. 1.

In practice, to produce a hob according to my method, a tool is employed, so formed as to produce hob teeth, the combined effect whereof is to generate correct involute gear teeth when the hob is placed with its axis parallel to the plane of the gear being cut. The backing off carriage 40 is then adjusted to an angle to the hob axis as illustrated in Fig. 1. This angle varies with the helix angle of the hob and is preferably about half the obliquity of the helix angle, although this depends partly upon the amount of radial relief required in the hob teeth. The tool post slide is then counter adjusted so as to bring the tool at right angles to the hob axis. When the machine is started, the hob rotates and the main carriage 60 feeds along in the ordinary manner, and the carriage 40 reciprocates back and forth with a slow motion inward and a quick return, but on account of its obliquity of travel, the effect is to retard the feed of the tool parallel to the hob axis and consequently the hob teeth, instead of conforming to a helicoid of the Zimmermann type, conform only at their cutting faces and are straightened from this point backward so that the individual teeth are more nearly parallel to a plane perpendicular to the hob axis. Roughly speaking, the chief reason why an ordinary hob must be placed at an oblique angle to the work is to prevent the back portion of its teeth from interfering with the teeth of the work. By properly modifying the cross section of the helicoidal thread of the hob (the profile of the hob teeth) the hob may be placed with its axis parallel to the plane of the gear being cut, but if this is attempted for any helix angles except small ones the back of the hob teeth will interfere with the work, and hence this plan is practicable only within narrow limits. But by making the necessary modification in the profile of the hob teeth and then rectifying the teeth as in my method, the range within which the modification is practicable is greatly increased, and in addition, the action of the hob in cutting is much more uniform on the two sides of the teeth.

I have shown and described a machine in which a cutting tool is employed for producing a hob. It will be understood, by those skilled in the art, that after a hob is roughened out and hardened, it may be finished by means of a grinding tool and I wish to be understood as considering the use of a grinding tool as within the principle of my invention. Machines employing grinding wheels in the production of hobs are well known and shown for example in my prior Patent No. 1,232,715, issued July 10, 1917, also my prior Patent No. 1,238,935, issued Sept. 4, 1917.

Having thus described my invention what I claim as new and desire to secure by Letters Patent, is:—

1. The method of producing hobs consisting in rotating the hob, moving a tool lengthwise of the hob and simultaneously reciprocating it obliquely to the hob axis, the in-motion being against the lead of the hob.

2. The method of producing hobs consisting in rotating the hob, presenting a tool to the cylindrical face of the hob, causing a relative feed between the tool and the hob in an axial direction in accordance with the general helical lead of the hob, and reciprocating the tool obliquely to the axis of the hob in a direction against the lead of the hob.

3. The method of producing hobs consisting in rotating the hob, presenting a tool to the cylindrical face of the hob, the tool lying in a plane substantially perpendicular to the hob axis, moving the tool steadily lengthwise of the hob, except as modified by the cross-motion, and reciprocating the tool obliquely toward and from the hob axis, the in-motion being against the lead of the hob whereby the helix angle of the individual teeth is decreased, but the profiles of the teeth at the cutting faces thereof coincide with the true helicoid or worm of the hob.

4. The method of producing hobs consisting in rotating the blank about its axis, presenting a tool to the face of it, causing relative longitudinal motion between the tool and the blank, and reciprocating the tool obliquely toward and from the hob axis, the in-motion being against the lead of the hob.

In witness whereof, I have hereunto subscribed my name.

CARL G. OLSON.